(12) United States Patent
Nicolai et al.

(10) Patent No.: US 6,808,144 B1
(45) Date of Patent: Oct. 26, 2004

(54) AUTONOMOUS PAYLOAD RECOVERY SYSTEM

(75) Inventors: Leland M. Nicolai, Castaic, CA (US); William R. Ramsey, Jr., Altadena, CA (US); Douglas J. Robinson, Little Rock, CA (US)

(73) Assignee: Lockheed-Martin Corporation, Rockledge, MD (US)

( * ) Notice: Subject to any disclaimer, the term of this patent is extended or adjusted under 35 U.S.C. 154(b) by 0 days.

(21) Appl. No.: 10/331,009

(22) Filed: Dec. 26, 2002

Related U.S. Application Data (63) Continuation-in-part of application No. 09/922,167, filed on Aug. 6, 2001, now abandoned.

(51) Int. Cl.$^7$ .............................................. B64D 17/00
(52) U.S. Cl. ...................... 244/139; 244/146; 244/152
(58) Field of Search ................................ 244/139, 145, 244/146, 152, 137.1, 138 R; 701/3

(56) References Cited

U.S. PATENT DOCUMENTS

| | | | | |
|---|---|---|---|---|
| 3,796,398 A | * | 3/1974 | Eilertson | .................... 244/139 |
| 4,302,827 A | * | 11/1981 | Rosenblum | .................. 367/116 |
| 4,375,280 A | * | 3/1983 | Nicolaides | ..................... 244/13 |
| 5,678,784 A | * | 10/1997 | Marshall, Jr. et al. | ........... 244/2 |
| 5,899,415 A | * | 5/1999 | Conway et al. | ......... 244/138 R |
| 6,220,168 B1 | * | 4/2001 | Woodall et al. | .............. 102/411 |
| 6,338,457 B1 | * | 1/2002 | Hilliard et al. | .............. 244/139 |
| 6,343,244 B1 | * | 1/2002 | Yoneda et al. | .................. 701/3 |

\* cited by examiner

Primary Examiner—Galen L. Barefoot
(74) Attorney, Agent, or Firm—Koestner Bertani LLP; Mary Jo Bertani (57) ABSTRACT

A parafoil recovery system capable of autonomously controlling the descent profile of a payload to a recovery area and maneuvering the parafoil to execute a soft landing in the recovery area is disclosed. A descent profile management system determines wind speed and direction, altitude, heading, and position of the payload based on sensor input. The descent profile management system also determines a gliding flight path profile from the launch point to the desired recovery area. A flare and stall maneuver is executed at the end of the landing sequence by braking the parafoil to slow the vertical descent speed and groundspeed for a soft landing. The pitch attitude of the payload can be adjusted by the descent profile management system to prevent nose-first impact with the ground. The parafoil canopy is released from the payload upon touchdown to prevent the canopy from dragging the payload on the ground after landing.

35 Claims, 5 Drawing Sheets

AUTONOMOUS PAYLOAD RECOVERY SYSTEM

CROSS-REFERENCE TO RELATED APPLICATION

This application is a continuation-in-part of U.S. patent application Ser. No. 09/922,167 entitled Autonomous Control of a Parafoil Recovery System for UAVs", filed Aug. 6, 2001, now abandoned.

BACKGROUND

1. Technical Field

The present invention relates to an apparatus for the parachute recovery of a payload, and more particularly to a system for autonomously steering an airborne payload to a recovery area and soft landing of the payload.

2. Description of the Related Art

Current parachute recovery systems use an uncontrolled round (or ballistic) parachute. The parachute descends at a vertical speed depending on the relation of the size of the parachute to the weight of the payload. The, recovery systems also have a horizontal speed and direction equal to that of the surface wind. The round parachute system drifts with the wind and impacts the ground at a random orientation. This ground impact usually results in damage to the payload due to the vertical descent rate and the horizontal speed which causes the payload to tumble and/or slam into rocks, trees, etc. In addition, since the round parachute is difficult to steer and drifts with the wind, the ground impact location is random.

Clearly there is a need for a parachute recovery system that can be steered to a precise recovery area and then execute a soft landing, all autonomously.

The related art teaches several parachute recovery systems for the controlled steering of the system to a predetermined recovery area, but none include the soft landing offered by the present invention. For example, U.S. Pat. No. 5,201,482 to Ream, U.S. Pat. No. 5,620,153 to Ginsberg and U.S. Pat. No. 5,899,415 to Conway all use parafoils (or ram air parachutes) for controlling the glide path of the recovery system. These systems all rely on human piloting of the parafoil (i.e.; non-autonomous). U.S. Pat. No. 6,122,572 to Yavnai teaches an autonomous command and control unit for a powered airborne vehicle that uses a programmable decision unit capable of managing and controlling the execution of a mission by using subsystems and a data base capable of holding and manipulating data including pre-stored data and data acquired by and received from the various subsystems. U.S. Pat. No. 6,144,899 to Babb et al. discusses a recoverable airborne winged instrument platform for use in predicting and monitoring weather conditions. The platform is taken aloft by balloon means, accurately determines its present position and uses the data to execute a predetermined flight plan and ultimately guide its descent to a predetermined landing site. This is achieved by installing the instrument package payload in the aerodynamic exterior housing of the recoverable airborne instrument platform.

None of the systems available in the prior include components for autonomously managing and controlling a parafoil recovery system to a pre-selected recovery area, adjusting the orientation of the payload before landing, or executing a landing sequence that includes parafoil canopy flare and stall maneuvers.

SUMMARY

A parafoil recovery system capable of autonomously controlling the descent profile of a payload to a predetermined recovery area and manipulating the parafoil to execute a soft landing in the recovery area is provided.

One advantageous feature of the system is a descent profile management system (DPMS) that can determine wind speed and direction, as well as altitude, heading and position of the payload, based on sensor input. The DPMS determines an optimum gliding flight path from the launch point to the desired recovery area, and then controls the recovery system to land the payload at or near the desired recovery site.

Another advantageous feature of the system includes one or more attitude control lines that allow the attitude of the payload to be adjusted either before or during flight to prevent nose-first impact with the ground.

A further feature of the system that offers advantages over known systems includes executing a flare maneuver near the end of the landing sequence by braking the parafoil to slow the descent of the payload for a soft landing. When the payload is within a predetermined height above ground, the canopy of the parafoil is stalled to decrease the ground speed and vertical descent speed at touchdown. The parafoil canopy is released from the payload upon touchdown to prevent the canopy from dragging the payload on the ground after landing. The parafoil recovery system thus delivers a payload at or near a specified recovery location with minimal ground impact damage.

Although the present invention is briefly summarized, the fuller understanding of the invention is obtained by the following drawings, detailed description, and appended claims.

BRIEF DESCRIPTION OF THE DRAWINGS

These and other aspects, features and advantages of the present invention will become better understood with reference to the accompanying drawing, wherein.

DETAILED DESCRIPTION

Figure 1:
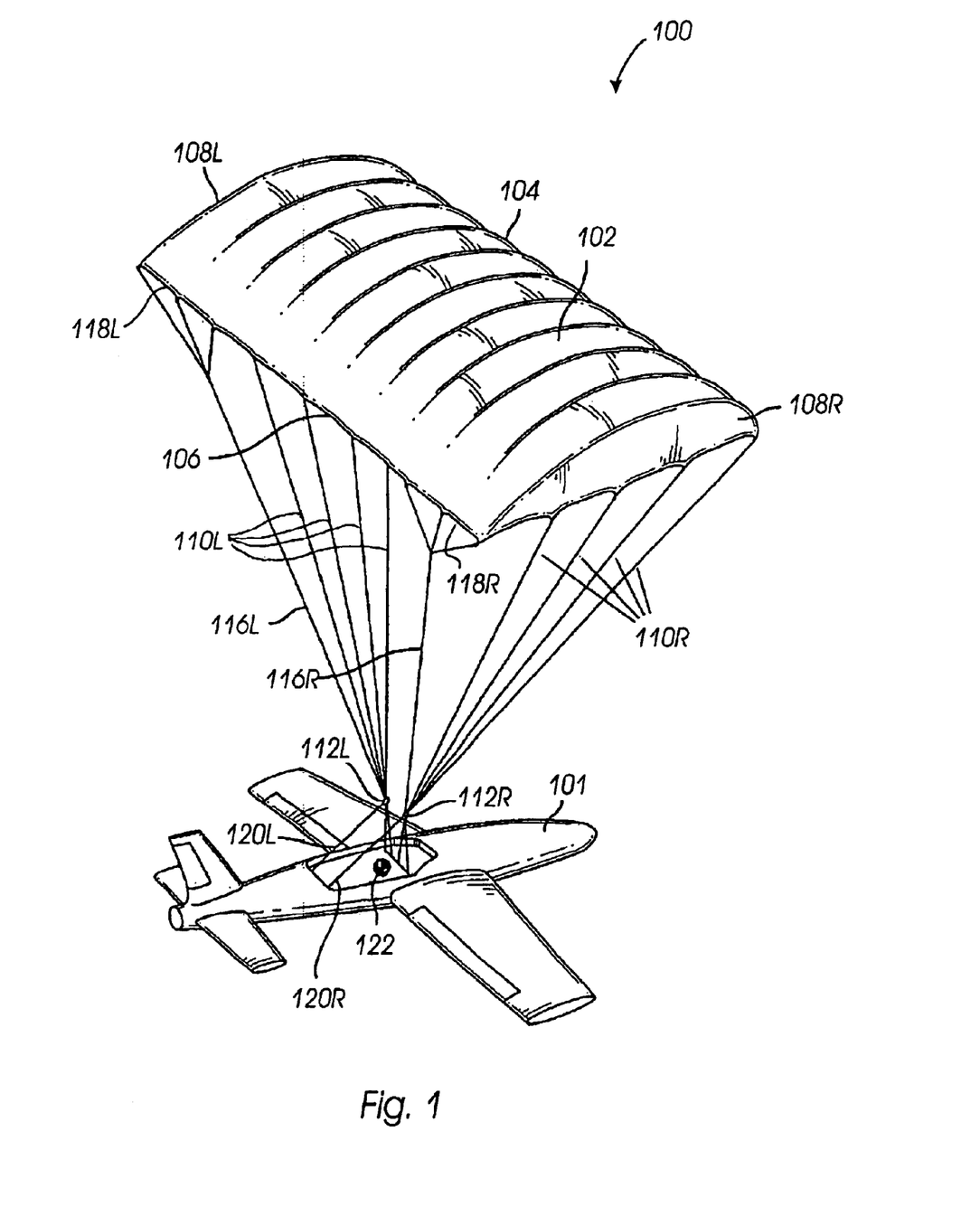
FIG. 1 is a diagram depicting an embodiment of a parafoil attached to a payload.

Referring to FIG. 1, an embodiment of parafoil recovery system 100 for recovering payload 101, such as an unmanned air vehicle, at a desired location at the end of a flight is shown. To simplify notation, reference numbers suffixed with "R" (right) or "L" (left) in the figures are, in some instances, designated collectively or in the alternative herein by the reference number without the "R" or "L" suffix.

Parafoil canopy 102 had a leading edge 104, trailing edge 106, and sides 108R, 108L. Canopy 102 is typically a rectangular or oval shaped fabric wing with a spanwise series of cells that are inflated by ram-air pressure during flight. Canopy 102 can be deployed from payload 101 automatically when a predetermined event occurs, such as reaching a specified location or being aloft for a specified time period. Alternatively, an operator can command deployment of canopy 102 from a remote location via a data uplink/telemetry system (not shown).

Main risers 110R, 110L connect respective sides 108 of canopy 102 to one end of harnesses 112R, 112L. The other end of harnesses 112 are attached to payload 101. Brake line risers 116R, 116L connect left and right outer portions of trailing edge 106 to brake lines 120R, 120L.

Figure 2A:
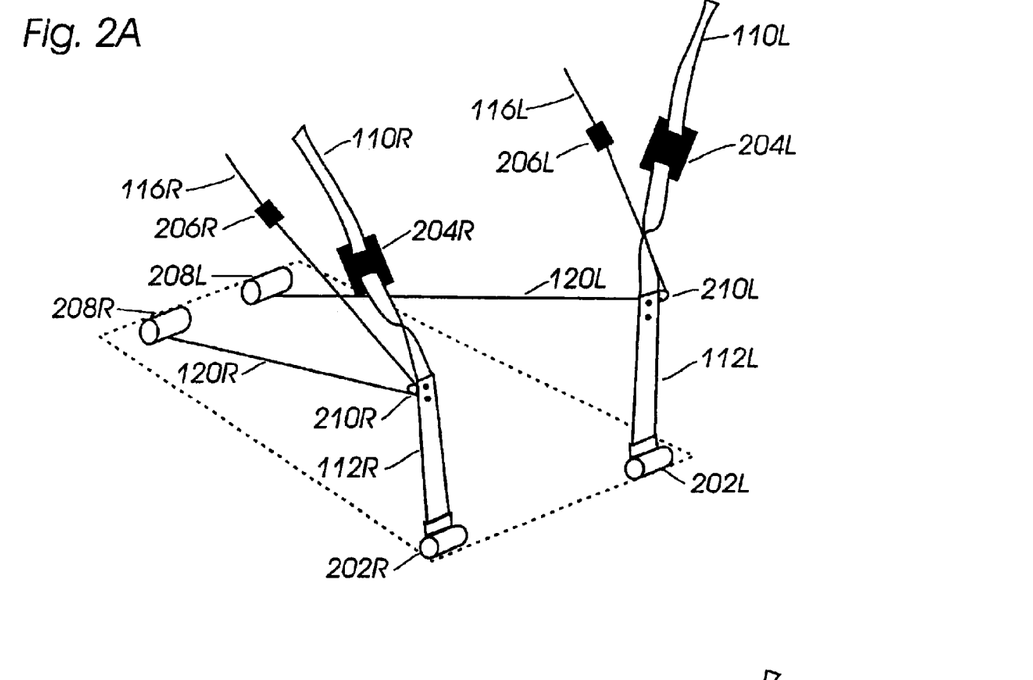
FIG. 2A is a diagram of an embodiment of a harness and control line system for retaining the payload to the canopy, and for controlling the descent and landing of the payload.

Referring now to FIGS. 1 and 2A, FIG. 2A is a diagram of an embodiment of a configuration of harnesses 112 and brake line risers 116 is shown for retaining the payload 101 to canopy 102, and for controlling the descent and landing of payload 101. Any suitable type of releasable or fixed attachment mechanism can be utilized to implement attachment points 202. In some embodiments, attachment points 202 are positioned at or ahead of the center of gravity 122 of payload 101 to prevent payload 101 from having a nose-down orientation during the landing. Harnesses 112 can be fabricated using any suitable rigid or flexible material.

Main risers 110 are coupled to harnesses 112 via quick-release connectors 204R, 204L. Similarly, brake line risers 116 are coupled to brake lines 120 via quick-release connectors 206R, 206L. When payload 101 touches ground, quick-release connectors 204, 206 disconnect risers 110, 116 from harnesses 112 and brake lines 120, respectively, to prevent payload 101 from being pulled along the ground by canopy 102. In other embodiments, quick-release connectors 204, 206 may not be used. In still other embodiments, main risers 110 can be coupled to a single harness 112 with or without a quick release connector 204. Any suitable type of quick-release-connector can be utilized to implement quick-release connectors 204, 206.

Reel motors 208R, 208L are mounted on payload 101. A length of brake lines 120 is wound around a spindle on reel motors 208. The spindle is rotated to wind or unwind the brake lines 120, thereby adjusting the length of brake lines 120. The resulting force is applied to the outer trailing edge portions of canopy 102. Other suitable types of devices for adjusting the length of brake lines 120 can be utilized in addition to or instead of reel motors 208.

The embodiment shown in FIG. 2A shows reel motors 208 mounted behind the center of gravity 122 of payload 101 to retain payload 101 in a substantially horizontal orientation during the descent. Brake lines 120R, 120L are coupled to reel motors 208R, 208L, respectively, and are threaded through pulleys 210R, 210L in harnesses 112. Reel motors 208 are coupled to a control system (not shown), which issues commands to operate reel motors 208 to lengthen or shorten brake lines 120R, 120L. When one of brake lines 120 is shortened, the corresponding outer portion 118 of trailing edge 106 is pulled downward, thereby increasing drag and causing canopy 102 to turn toward the side 108 with the increased drag. When brake lines 120 are the same length, canopy 102 will descend without turning. When both brake lines 120 are shortened the same amount, drag increases over the entire canopy 102, thereby slowing the descent rate and horizontal glide speed (also referred to as "braking") of canopy 102. The control system (not shown) is capable of combining commands to turn and brake canopy 102 simultaneously.

Figure 2B:
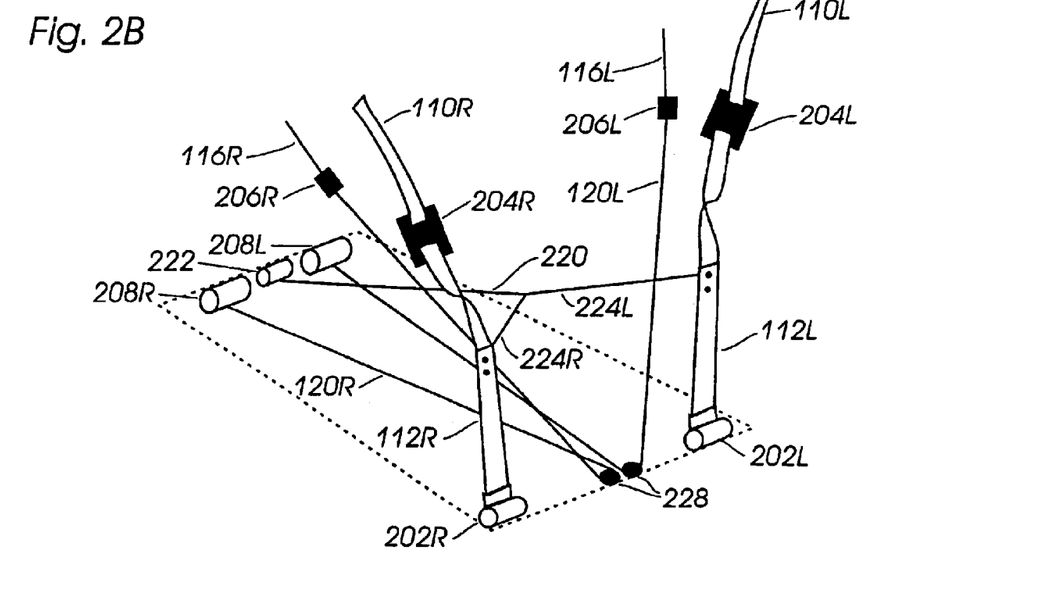
FIG. 2B is a diagram of another embodiment of a harness and control line system for retaining the payload to the canopy, and for controlling the descent and landing of the payload.

Referring to FIGS. 1 and 2B, another embodiment of harnesses 112 is shown in FIG. 2B including pitch control line 220 to control the nose-up/nose-down orientation of payload 101 during descent. In the embodiment shown in FIG. 2B, pitch control line 220 is connected between a point behind the center of gravity 122 and another point ahead of the center of gravity 122 of payload 101. The length of pitch control line 220 is adjusted via reel motor 222, thereby controlling the pitch orientation of payload 101. Reel motor 222 is operated by a control system (not shown) capable of determining a desired orientation for payload 101 and coupled to feedback sensors regarding the actual orientation of payload 101.

In other embodiments, pitch control line 220 can be a fixed length attached at various points to payload 101 to provide the desired pitch orientation for payload 101. Such embodiments eliminate the need for reel motor 222, and corresponding feedback sensors and control logic. Pitch control line 220 is shown in FIG. 2B as including two segments 224R, 224L branching to harnesses 112R, 112L, however, a variety of configurations and any suitable type of material can be utilized to implement pitch control line 220. Additionally, attitude control lines and reel motors configured to adjust the orientation of payload 101 in other directions in addition to pitch can also be utilized.

In the embodiment shown in FIG. 2B, brake lines 120 are configured to thread through a central pulley 228 instead of pulleys 210 on harnesses 112. Such a configuration eliminates any influence adjustment of the brake lines 120 may have on the pitch attitude of payload 101.

Figure 3:
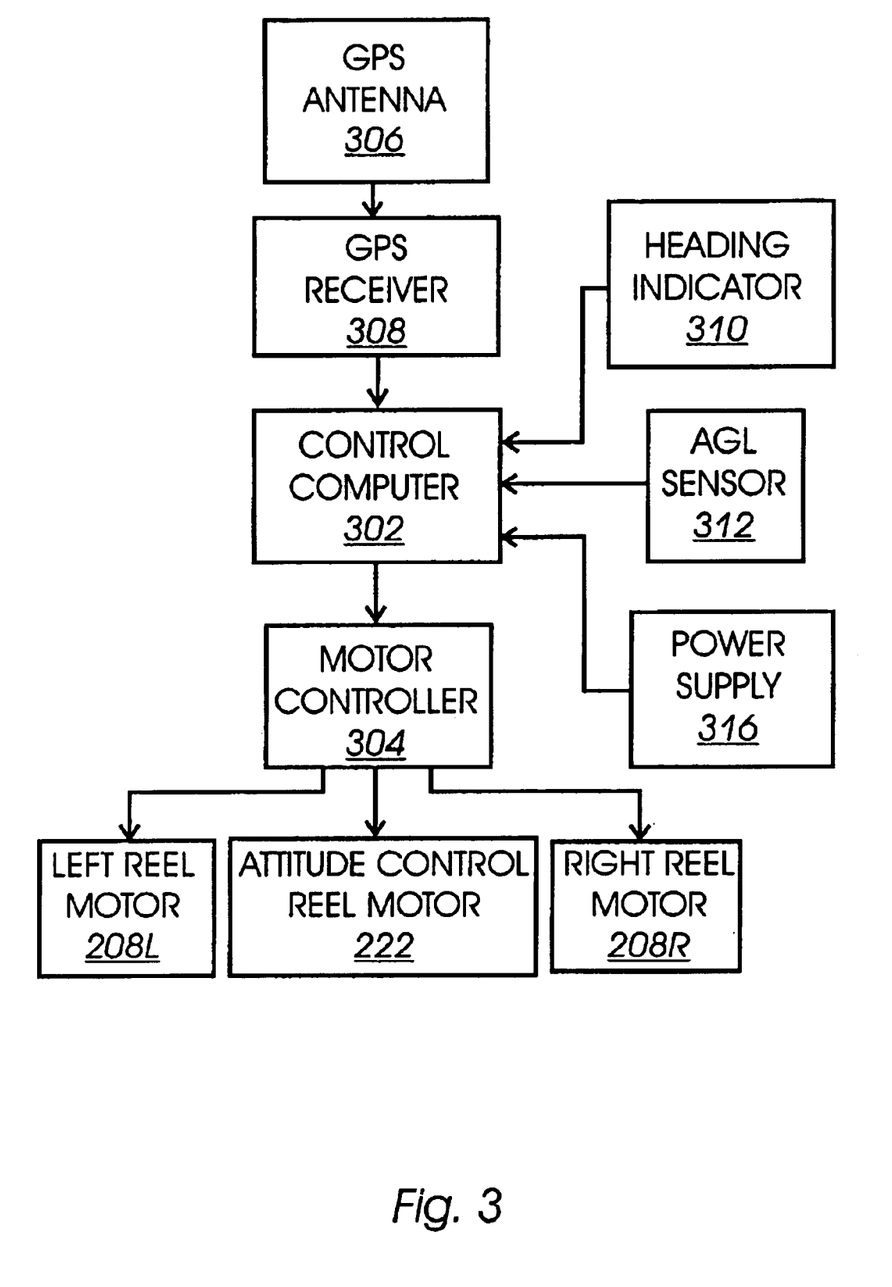
FIG. 3 is a diagram of components included in an embodiment of a control system for controlling the descent of the parafoil and payload shown in FIG. 1.

Referring now to FIGS. 1 and 3, FIG. 3 shows a block diagram of an embodiment of a descent profile management system (DPMS) 300 that can be used to control parafoil canopy 102 in flight. The control functions are performed by generating commands in control computer 302 and transmitting the commands in the form of electrical pulses to actuators (not shown) in reel motors 208, 222 via motor controller 304. Reel motors 208 are physically connected to brake lines 120, which are used for right and left turns as well as to control the descent rate of payload 101.

Pitch reel motor 222 is also coupled to receive position commands to adjust pitch control line 220 so that payload 101 has the desired pitch attitude. For example, when payload 101 includes external components, such as wings, that can influence the descent profile, the pitch attitude of payload 101 can be adjusted during the landing sequence to help achieve the desired descent profile. Additionally, the pitch attitude of payload 101 can be adjusted before touchdown to avoid a nose-first impact with the ground, as required.

DPMS 300 includes several sensors that provide information such as heading, speed, location, and altitude to control computer 302. When available, instrumentation and equipment in payload 101 can be coupled to DPMS 300 to provide sensor information, as well as to implement and provide power to control computer 302. Control computer 302 determines the resulting change to the descent profile of payload 101 based on feedback from GPS receiver 308, heading indicator 310, and AGL sensors 312, which enables control computer 302 to make further adjustments to achieve the desired state including descent rate, ground speed, position relative to the desired recovery point, and heading orientation relative to the wind speed and direction. While the embodiment of DPMS 300 in FIG. 3 shows certain sensors to provide information such as position, speed, heading, and altitude, other types of sensors can be used to provide information to DPMS 300 in addition to, or instead of, the sensors shown in FIG. 3.

One sensor included in the embodiment of DPMS 300 shown in FIG. 3 is a global positioning system (GPS) antenna 306 and GPS receiver 308 to provide latitude, longitude, and altitude of payload 101. GPS antenna 306 represents one or more antenna devices that are capable of receiving radio frequency (RF) signals transmitted from GPS satellites (not shown). GPS receiver 308 receives RF signals from GPS antenna 306, tunes the desired frequency (s), and detects/demodulates the position information in the signal(s). Various embodiments of GPS receiver 308 can include components for handling analog and/or digital data, as required. Other suitable systems that provide position information for payload 101, such as an inertial navigation system, a dead reckoning navigation system, differential GPS, distance measuring equipment, and/or a combination of position information systems can be utilized in addition to, or instead of, GPS antenna 306 and GPS receiver 308.

Another sensor that is shown in the embodiment of DPMS 300 in FIG. 3 is heading indicator 310 that provides signals to control computer 302 that indicate the magnetic heading of payload 101. Any suitable heading indicator, such as gyroscope-based systems, magnetic compasses, or other magnetic flux detecting/heading indicator devices can be utilized. Control computer 302 can include logic to compensate for magnetic lead and lag errors that are observed during turns with magnetic compasses.

One or more sensors for providing information regarding the height of payload 101 above ground level (AGL) to control computer 302 is also included in DPMS 300, as represented by AGL sensor(s) 312 in FIG. 3. In some embodiments, a radar altimeter provides very accurate height above ground information by transmitting radio frequency signals directly below payload 101 and receiving reflections of the signals as they return from the ground. The time measured between transmission and reception of the same signal is used to determine the distance from payload 101 to the ground. Other suitable types of sensors can be utilized to implement AGL sensor(s) 312, in addition to, or instead of, a radar altimeter.

Control computer 302 includes logic to determine the ground speed of payload 101 based on the change in position of payload 101 over time. Control computer 302 also includes logic to estimate wind speed and wind direction based on the ground speed, the change in position, and the heading of payload 101 over time. Outer trailing edge portions 118 of canopy 102 can be adjusted to account for the effect of the wind on the descent profile of payload 101, and to help insure that payload 101 lands at or near the desired recovery site.

DPMS 300 can also include telemetry/uplink communication equipment (not shown) that allows an operator at a remote location from payload 101 to enter/update information being used by control computer 302 regarding wind speed and direction at various altitudes, location of payload 101, and the desired recovery location. DPMS 300 can also include equipment to receive transmissions from automated flight information services to update information such as position, and wind speed/direction in the vicinity.

Power supply 316 provides power at the required voltage (s) to components in DPMS 300. A portable battery or set of batteries capable of supplying different voltages can be utilized to implement power supply 316. Other suitable devices, such as solar energy cells, can also be utilized in addition to, or instead of, batteries.

In some embodiments, control computer 302 includes a data processor that includes electronic circuits capable of executing logic instruction, memory for electronically storing data and software, and interfaces that allow control computer 302 to communicate information with other components of DPMS 300. Other embodiments of control computer 302 can include data recording facilities for post-landing analysis. Control computer 302 can be implemented using a suitable combination of hardware, firmware, and software components.

Figure 4:
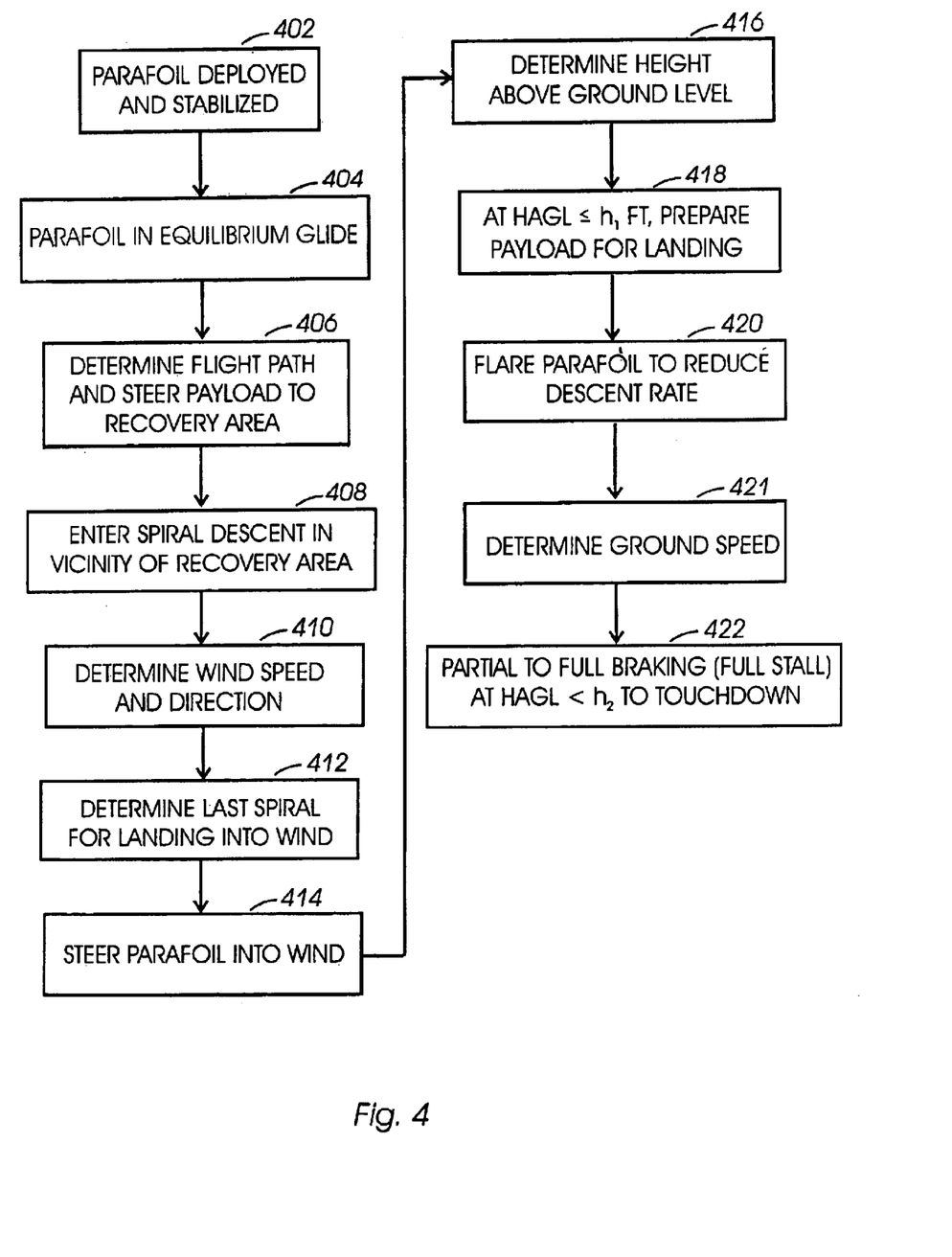
FIG. 4 is a flow diagram showing some of the functions performed by the control system of FIG. 3.
Figure 5:
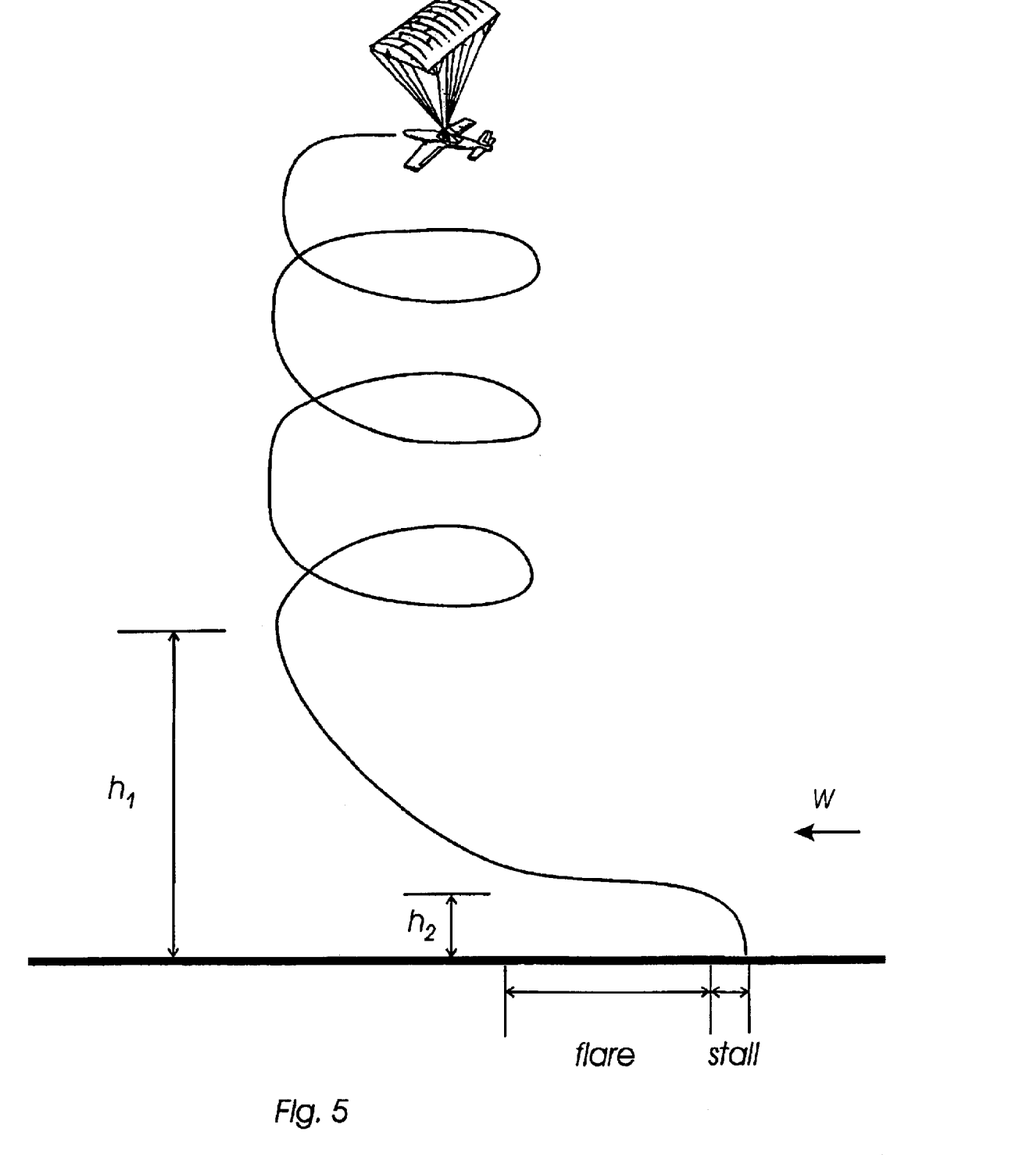
FIG. 5 is a diagram showing an embodiment of a controlled descent and flared landing profile of the parafoil and payload shown in FIG. 1.

Referring to FIGS. 1, 2B, 3, 4 and 5, FIG. 4 shows an embodiment of a flow diagram of logic processes included in control computer 302 to execute a descent and landing sequence when canopy 102 is deployed. FIG. 5 shows a profile diagram of the descent and landing sequence outlined in the processes in FIG. 4.

Payload 101 can be any type of item or system that flies or is drop-shipped from the air. In a system capable of flight, canopy 102 can be deployed by DPMS 300 automatically based on fulfilling one or more criteria, such as duration of flight, operator control from a remote location, arrival at a destination, or an aborted mission. For drop-shipped items, canopy 102 can be deployed using any suitable means, such as operator control from a remote location, a static line on the vehicle from which payload 101 is dropped, or automatically using a release device coupled to control computer 302 that is activated upon reaching a predetermined altitude above ground.

Control computer 302 monitors sensor information, such as the heading, groundspeed, and descent rate of payload 101 to determine when canopy 102 is fully deployed in process 402. Brake lines 120 are then adjusted on canopy 102 to achieve a pre-specified glide slope, shown for example, in process 404 as descending at a rate of 70 feet per second with a glide angle of approximately 23 degrees relative to the surface of the ground. The glide slope and/or descent rate to be achieved during various stages of the descent profile can be adjusted by control computer 302 based on various factors, such as groundspeed, wind speed/direction, and altitude of payload 101 above ground.

Process 406 can be included to determine the position of payload 101 with respect to a desired recovery location. If payload 101 is not within a desired distance of the recovery location, brake lines 120 are adjusted to steer toward the recovery location.

Process 408 adjusts brake lines 120 to enter a downward spiral flight path over the desired recovery location. Typically, one brake line 120 is reeled in to turn canopy 102, however, both brake lines 120 may be adjusted at times during the spiral portion of the descent to correct drift of payload 101 from the recovery location due to the wind. The drift can be corrected by comparing the actual location of payload 101 to the desired location, and adjusting brake lines 120 accordingly to increase or decrease the turn rate to reposition payload 101 with respect to the recovery location.

Process 410 determines the wind speed and direction based on a constant rate turn over a period of time and drift from the desired recovery location during the turn. In the presence of wind W, the spiral deviates from a circular trajectory over a point on the ground. In some embodiments, the wind speed and direction can be determined from the differential distance covered during the short upwind leg and the long downwind leg. The direction of the wind W is in the direction of the long downwind leg and the wind speed is the difference in distance covered divided by the time to complete a quarter turn. The wind speed and direction information can be used to continually adjust brake lines 120 during the spiral to avoid drift.

Once the wind speed and direction are determined, process 412 determines the altitude $h_1$ above ground level at which to end the spiral descent. It is desirable to turn out of the spiral with front edge 104 of canopy 102 aligned heading into the wind W. By heading into the wind, the groundspeed of payload 101 is reduced, thereby reducing the potential for damage to payload 101 during landing. The height $h_1$ for ending the spiral descent is based on the altitude lost during each 360 degree turn in the spiral, the difference between the altitude of payload 101 and a second height above ground level $h_2$, at which the final descent and landing sequence is started, and the direction and magnitude of the wind W.

Process 414 steers canopy 102 into the wind W at a specified descent rate until payload 101 reaches second height above ground level $h_2$, as monitored by processes 416 and 418. Some embodiments of process 418 also adjust pitch control line 220 to achieve a nose-up attitude for payload 101. At altitude $h_2$, control computer 302 commands reel motors 208 to simultaneously deflect trailing edges 118 downward to start the landing flare in process 420. During the flare sequence, canopy 102 decreases the vertical descent of payload 101 to be at or less than a specified rate, such as 5 feet per second.

Process 421 determines the groundspeed of payload 101 based on the wind W. Process 422 utilizes the groundspeed of payload 101 to determine the amount of braking required to stall canopy 102 when the height of payload 101 above ground level is less than a specified distance, such as 10 feet. During a stall, the angle of canopy 102 with respect to the relative wind W increases until the air separates over the top of canopy 102, thereby losing the lifting capability of canopy 102. When canopy 102 stalls, payload 101 descends at a steeper angle until the tail portion of payload 101 touches the ground. The drag from the tail of payload 101 rapidly slows forward movement as the nose of payload 101 continues to descend.

When the weight of payload 101 is removed from canopy 102, quick release connectors 204, 206 release canopy 102 from payload 101 to prevent payload 101 from being dragged along the ground by the wind W until canopy 102 deflates. In some embodiments, pyrotechnic devices that are activated by DPMS 300 can be coupled between brake lines 120 and control lines 116, and between main risers 110 and harnesses 112 instead of mechanical quick-release connectors, to jettison canopy 102 at touchdown, or at any other time whether canopy 102 is deployed or not.

Control computer 302 determines the amount of braking required to stall canopy 102 in process 422 based on the descent rate and the ground speed of payload 101. The control logic adjusts brake lines 120 to minimize the vertical descent speed and the ground speed at impact. For example, full braking is typically required in no wind conditions, while little or no braking may be necessary when the magnitude of the wind W is equivalent to the horizontal glide speed of the system 100. The weight of payload 101 and the lifting capacity of canopy 102 affect the horizontal glide speed and vertical descent rate of payload 101. A proper combination of payload weight divided by canopy size (referred to as "parafoil loading") is therefore selected to allow the descent of payload 101 to be controlled as desired.

As an example of the operation of one embodiment of payload recovery system 100, when canopy 102 deploys at a parafoil loading of 2.14 pounds per square foot, an equilibrium glide is established at a horizontal glide speed of approximately 64 feet per second, a vertical descent speed of 26 feet per second, and a descent angle of 23 degrees with respect to the horizontal. DPMS 300 steers payload 101 to the recovery site, and enters a spiral descent The radial distance from payload 101 to the recovery site is monitored, and brake lines 120 are adjusted to maintain a spiral descent with the recovery site at the approximate center of the spiral. The wind direction and speed can be estimated based on logic in process 410 described hereinabove. DPMS 300 adjusts the tension on the brake lines 120 to retain the recovery site at the center of the spiral.

When the wind speed and direction are estimated, DPMS 300 determines the altitude h, at which payload recovery system 100 should turn out of the spiral to be heading into the wind for landing. The determination of altitude A, is based on the descent rate and time required for each complete turn in the spiral. Once payload 101 reaches altitude $h_1$, DPMS 300 rolls out of the spiral and begins the final descent phase. DPMS 300 adjusts brake lines 120 to slow the descent rate of payload 101. Attitude control line 220 can also be adjusted to help insure that payload touches ground at the desired orientation. The amount of braking required depends on the descent rate and wind speed. In one embodiment, DPMS 300 slows the descent rate to less than 5 feet per second when payload 101 is 10 feet above ground level. At that point, partial to full braking is applied to stall canopy 102 and slow the ground speed to less than 5 feet per second. Quick-release connectors 204, 206 disconnect canopy 102 from payload 101 once payload 101 is on the ground.

Recovery system 100 can thus deliver payload 101 at or near a specified recovery location with minimal ground impact damage. The attitude of payload 101 during touchdown can be controlled so that only a portion of payload 101 touches the ground first. The touchdown portion of payload 101 can be reinforced to resist any damage that may be inflicted upon impact with the ground. Further, the descent rate can be slowed to a minimum before touchdown to further prevent damage to payload 101. Other descent and landing patterns can be programmed into DPMS 300, either before takeoff or during flight.

While the invention has been described with reference to various embodiments, it will be understood that these embodiments are illustrative and that the scope of the invention is not limited to them. Many variations, modifications, additions and improvements of the embodiments described are possible. For example, those having ordinary skill in the art will readily implement the steps necessary to provide the structures and methods disclosed herein. Further, functions performed by various components can be implemented in hardware, software, firmware, or a combination of hardware, software, and firmware components. Variations and modifications of the embodiments disclosed herein may be made based on the description set forth herein, without departing from the scope of the invention as set forth in the following claims.

In the claims, unless otherwise indicated the article "a" is to refer to "one or more than one".

We claim:

1. A system for autonomously controlling the glide path and flare landing of a parafoil to recover an airborne payload, comprising:

a processor;

sensors coupled to communicate with the processor, wherein the processor is operable to:

determine at least one of the group of: wind speed, wind direction, altitude, heading, and position of the payload based on information from the sensors;

determine the pitch attitude of the payload;

determine adjustments to brake lines on the parafoil to execute a glide flight profile to a predetermined altitude, flare the parafoil to slow the descent rate, and stall the parafoil to land the payload; and determine adjustments to a pitch attitude control line to control the pitch orientation of the payload.

2. The system of claim 1, further comprising a motor functionally coupled with the processor, wherein the motor is operable to adjust the length of a control line, wherein the control line is coupled to a control surface on the parafoil.

3. The system of claim 2, wherein the control surface comprises a flexible trailing edge of the parafoil.

4. The system of claim 1, further comprising a power supply coupled to provide power to the processor and at least a portion of the sensors.

5. The system of claim 1, further comprising a quick release connector coupled between the parafoil and the payload, wherein the release connector is operable to automatically release at least a portion of the parafoil from the payload upon landing.

6. The system of claim 2, wherein the processor further determines when to adjust the control surface to enter a spiral flight path.

7. The system of claim 6, wherein the processor further determines when to adjust the control surface to discontinue the spiral flight path and enter a landing fight path.

8. An apparatus for autonomously controlling the glide path and landing of an airborne payload, wherein the payload is coupled to a parafoil, comprising:

a descent profile management system operable to:
adjust at least one control surface on the parafoil to control the flight path of the payload; and
adjust an attitude line to control the pitch orientation of the payload before touchdown.

9. The apparatus of claim 8, further comprising:
a release mechanism coupled between the parafoil and the payload, wherein the release mechanism is operable to release at least a portion of the parafoil from the payload upon touchdown.

10. The apparatus of claim 8, further comprising:
a sensor system operable to determine at least one of: wind speed, wind direction, altitude, heading, and position of the payload.

11. The apparatus of claim 8, wherein the processing system is further operable to:
adjust the flight path and the pitch attitude of the payload to flare the payload to a landing.

12. The apparatus of claim 8, wherein the payload is an air vehicle and the descent profile management system is further operable to:
adjust the pitch attitude line to cause the air vehicle to land tail first.

13. The apparatus of claim 10, wherein the processing system is further operable to:
adjust at least one control surface to cause the parafoil to execute a downward spiral flight path;
determine a last spiral in the downward spiral flight path; and
exit the last spiral and glide to a landing with the payload heading into the wind.

14. The apparatus of claim 8, further comprising:
a first actuator to adjust a control line attached to the at least one control surface, wherein operation of the first actuator is controlled by the descent profile management system; and
a second actuator to adjust the attitude line, wherein operation of the second actuator is controlled by the descent profile management system.

15. An autonomous air vehicle comprising:
a navigation system; and
a control system functionally coupled to the navigation system, wherein the control system includes instructions operable to:
determine when the air vehicle is in the vicinity of a predetermined recovery area based on information from the navigation system;
deploy a parafoil when the air vehicle is in the vicinity of the recovery area, wherein the parafoil is coupled to the air vehicle with a quick release buckle to release at least a portion of the parafoil upon landing, and the parafoil includes a control line coupled to the control system;
control the parafoil to descend and land substantially near the recovery area; and
adjust a pitch attitude line to change the pitch orientation of the air vehicle.

16. The air vehicle of claim 15, wherein the control system further comprises instructions operable to:
determine wind speed and wind direction relative to the air vehicle during a spiral descent flight path to the landing location.

17. The air vehicle of claim 16, wherein the control system further comprises instructions operable to:
flare the parafoil at a predetermined height above the ground.

18. The air vehicle of claim 15, further comprising
a reel motor, wherein the pitch attitude line is coupled at one end to the reel motor and at another end to an attach point remote from the reel motor along the longitudinal axis of the air vehicle, and the reel motor is operable to wind and unwind the pitch attitude line to raise and lower the nose of the air vehicle.

19. The air vehicle of claim 18, wherein the control system further comprises instructions operable to:
raise the nose of the air vehicle during landing when the air vehicle reaches a predetermined height above the ground.

20. A system for autonomously controlling the glide path and flare landing of a parafoil to recover an airborne payload, comprising:
a processor;
sensor means coupled to communicate with the processor, wherein the processor is operable to:
determine at least one of the group of: wind speed, wind direction, altitude, heading, and position of the payload based on information from the sensors;
control the pitch attitude orientation of the payload; and
determine adjustments to brake lines on the parafoil to execute a glide flight profile, a flare, and stall of the parafoil to land the payload.

21. The system of claim 20, further comprising means for adjusting a control line coupled to a control surface on the parafoil.

22. The system of claim 21, wherein the control surface comprises a flexible trailing edge of the parafoil.

23. The system of claim 20, further comprising power supply means for providing power to the processor.

24. The system of claim 20, further comprising release means for automatically releasing at least a portion of the parafoil from the payload upon landing.

25. The system of claim 21, wherein the processor further determines when to adjust the control surface to enter a spiral flight path.

26. The system of claim 20, wherein the processor further determines when to adjust the control surface to discontinue the spiral flight path and enter a landing flight path.

27. A payload recovery system comprising:

a navigation system; and a control system functionally coupled to the navigation system, wherein the control system includes instructions operable to:

steer the payload to the vicinity of a recovery area;

deploy a parafoil, wherein the parafoil is coupled to the payload with a release mechanism to release at least a portion of the parafoil upon landing;

adjust a control line coupled to the parafoil to control the descent profile of the payload; and adjust an attitude control line to change the pitch attitude orientation of the payload.

28. The system of claim 27, wherein the control system further comprises instructions operable to:

determine wind speed and direction relative to the payload during a spiral descent flight path to the landing location.

29. The system of claim 28, wherein the control system further comprises instructions operable to:

flare the parafoil at a predetermined height above the ground; and stall the parafoil at another predetermined height above the ground.

30. The system of claim 27, further comprising:

a reel motor positioned along the longitudinal axis of the payload, wherein the pitch attitude line is coupled at one end to the reel motor and at another end to an attach point remote from the reel motor along the longitudinal axis of the payload, and the reel motor is operable to wind and unwind the pitch attitude line to raise and lower a portion of the payload.

31. The system of claim 30, wherein the control system further comprises:

instructions operable to raise the front portion of the payload during landing when the payload reaches a predetermined height above the ground.

32. A method for recovering a payload, the method comprising:

deploying a parafoil coupled to the payload;

adjusting at least one control surface on the parafoil to control the descent of the payload;

executing a spiral descent until the payload is within a determined height above ground;

adjusting the pitch orientation of the payload to avoid impacting the ground with the front portion of the payload on touchdown;

flaring the parafoil to slow the descent rate of the payload; and stalling the parafoil when the payload is within a second height above the ground.

33. The method of claim 32 further comprising:

determining when to stop the spiral descent to establish a final glide path segment heading in to the wind before touchdown.

34. The method of claim 32 further comprising:

adjusting the at least one control surface to position the payload near the desired recovery point before touchdown.

35. The method of claim 32 further comprising:

releasing the parafoil from the payload upon touchdown.

* * * * *